US012710509B2

(12) United States Patent
Gloekler

(10) Patent No.: US 12,710,509 B2
(45) Date of Patent: Aug. 18, 2026

(54) RADAR SYSTEM AND METHOD FOR OPERATING A RADAR SYSTEM

(71) Applicant: Robert Bosch GmbH, Stuttgart (DE)

(72) Inventor: Tilman Gloekler, Reutlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 237 days.

(21) Appl. No.: 18/726,147

(22) PCT Filed: Jan. 2, 2023

(86) PCT No.: PCT/EP2023/050017
§ 371 (c)(1),
(2) Date: Jul. 2, 2024

(87) PCT Pub. No.: WO2023/135033
PCT Pub. Date: Jul. 20, 2023

(65) Prior Publication Data

US 2025/0067838 A1 Feb. 27, 2025

(30) Foreign Application Priority Data

Jan. 13, 2022 (DE) ..................... 10 2022 200 283.0

(51) Int. Cl.
*G01S 7/35* (2006.01)
*G01S 13/931* (2020.01)

(52) U.S. Cl.
CPC ............. *G01S 7/352* (2013.01); *G01S 13/931* (2013.01)

(58) Field of Classification Search
CPC ........ G01S 7/352; G01S 13/931; G01S 13/34; G01S 13/584
See application file for complete search history.

(56) References Cited

U.S. PATENT DOCUMENTS 9,448,300 B2 * 9/2016 Jansen .................... G01S 13/34
9,541,637 B2 * 1/2017 Searcy .................... H03M 7/30
(Continued)

FOREIGN PATENT DOCUMENTS

DE 102008008293 A1 8/2009
DE 102013212090 A1 1/2015
(Continued)

OTHER PUBLICATIONS

International Search Report for PCT/EP2023/050017, Issued Feb. 13, 2023.
(Continued)

*Primary Examiner* — Yonghong Li
(74) *Attorney, Agent, or Firm* — NORTON ROSE FULBRIGHT US LLP

(57) ABSTRACT

A radar system including a transmitting/receiving unit, which is designed to generate and output radar signals by means of a fast chirp modulation method, and to receive chirps of the reflected radar signals. The radar system includes a memory unit and an evaluation unit. The evaluation unit is designed such that, based on the received chirps of the reflected radar signals, it creates a multi-dimensional radar data cube with a plurality of bins, by means of a Fourier transform, wherein each bin is assigned a complex data value. The evaluation unit is also designed such that, for each complex data value, a real component of the complex data value and an imaginary component of the complex data value is each converted into a logarithmic fixed point representation and stored in the memory unit.

9 Claims, 3 Drawing Sheets

(56) References Cited

U.S. PATENT DOCUMENTS

| | | | | |
|---|---|---|---|---|
| 9,946,687 | B2 * | 4/2018 | Lerner | G06F 17/142 |
| 10,520,584 | B2 * | 12/2019 | Wintermantel | G01S 13/343 |
| 12,019,177 | B2 * | 6/2024 | Roger | G01S 7/41 |
| 12,265,175 | B2 * | 4/2025 | Roger | G01S 7/354 |
| 2016/0033631 | A1 | 2/2016 | Searcy et al. | |
| 2016/0377724 | A1 | 12/2016 | Crouch et al. | |
| 2017/0054449 | A1 | 2/2017 | Mani et al. | |

FOREIGN PATENT DOCUMENTS

| | | | |
|---|---|---|---|
| EP | 1843246 | A2 | 10/2007 |
| EP | 2950451 | A1 | 12/2015 |
| EP | 2980996 | A1 | 2/2016 |
| WO | 2005119426 | A1 | 12/2005 |
| WO | 2015185058 | A1 | 12/2015 |
| WO | 2017132670 | A1 | 8/2017 |

OTHER PUBLICATIONS

Bulic, “Fixed-Point Multiplication and Division in the Logarithmic Number System: a Way to low-Power Design,” 203 Review Scientific Paper, Midem, Journal of Microelectronics, Electronic Components and Materials, vol. 43, No. 4, 2013, pp. 203-211. http://www.midem-drustvo.si/Journal%20papers/MIDEM_43(2013)4p203.pdf Downloaded Jul. 1, 2024.

* cited by examiner 21
22
23
24
25
26
27
28
29
FFT
F
S
R
V
f
t

RADAR SYSTEM AND METHOD FOR OPERATING A RADAR SYSTEM

FIELD

The present invention relates to a radar system and to a method for operating a radar system.

BACKGROUND INFORMATION

Radar sensors are used in motor vehicles to determine relative distances, speeds or angles of objects in the vehicle's environment. Various modulation methods are available for this purpose. FMCW (Frequency Modulated Continuous Wave) radar systems use a radar signal of which the frequency is ramp-modulated. An exemplary angle-resolving FMCW radar sensor is described in German Patent Application No. DE 10 2013 212 090 A1.

Fast chirp modulation methods are also available, wherein the signal output by the radar sensor has a plurality of frequency-modulated signal pulses (chirps). A modulation pattern therefore consists of a plurality of consecutive chirps. The chirps are called "fast" ramps. In addition, it can be provided that the center frequencies of the chirps decrease or increase, resulting in a slow ramp for the center frequency.

U.S. Patent Application Publication No. US 2017/054449 A1 describes a method for the compressed representation of radar signals. A radar system with optimized storage of temporary data is described in PCT Patent Application No. WO 2015/185058 A1. A radar data compression system is described in U.S. Pat. No. 9,541,637 B2, in which redundancy of the data is removed.

SUMMARY

The present invention provides a radar system and a method for operating a radar system.

Preferred example embodiments of the present invention are disclosed herein.

According to a first aspect, the present invention relates to a radar system. According to an example embodiment of the present invention, the radar system includes a transmitting/receiving unit, which is designed to generate and output radar signals by means of a fast chirp modulation method, and to receive chirps of the reflected radar signals. The radar system also includes a memory unit and an evaluation unit. The evaluation unit is designed such that, based on the received chirps of the reflected radar signals, it creates a multi-dimensional radar data cube with a plurality of bins, by means of a Fourier transform, wherein each bin is assigned a complex data value. The evaluation unit is also designed such that, for each complex data value, a real component of the complex data value and an imaginary component of the complex data value is each converted into a logarithmic fixed point representation and stored in the memory unit.

According to a second aspect, the present invention relates to a method for operating a radar system. In the method according to an example embodiment of the present invention, radar signals are generated and output by a transmitting/receiving unit of the radar system using a fast chirp modulation method. The transmitting/receiving unit receives chirps of the reflected radar signals. An evaluation unit of the radar system creates a multi-dimensional radar data cube with a plurality of bins based on the received chirps of the reflected radar signals, by means of a Fourier transform, wherein each bin is assigned a complex data value. For each complex data value, the evaluation unit converts a real component of the complex data value and an imaginary component of the complex data value into a logarithmic fixed point representation and stores the logarithmic fixed point representation of the real component of the complex data value and the logarithmic fixed point representation of the imaginary component of the complex data value in a memory unit of the radar system.

In a fast chirp modulation method, the data is temporarily stored after the first Fourier transform (FT), which typically requires several megabytes of memory, but results in significant costs. Using the logarithmic fixed point representation results in a more compact representation, which can reduce the required storage space and thus the memory requirements. In this case, a number format is used in memory that efficiently represents the radar data in the frequency domain in a reduced bit width per data point.

According to an example embodiment of the present invention, each individual data point (i.e., each complex data value) is converted individually and no block conversion is performed. No redundancy of the data is removed, but rather one number format is converted into another number format.

The choice of number representation in the memory unit is very important because data reduction can lead to data loss ("lossy compression"), which in an automotive radar sensor must not violate the requirements for sensitivity, range and resolution. For this purpose, the present invention provides a radar system that supports a purely binary, logarithmic representation of the data after the first FT in the radar memory.

According to a further example embodiment of the radar system of the present invention, the evaluation unit is designed to scale a logarithm of an absolute value of the real component or imaginary component scaled by a first factor S by a second factor A in order to convert the real component of the complex data value or the imaginary component of the complex data value into the logarithmic fixed point representation.

According to a further example embodiment of the radar system of the present invention, the first factor S is selected to be equal to the inverse of the maximum permissible value for the absolute value of the real component or imaginary component.

According to a further example embodiment of the radar system of the present invention, the second factor A is selected according to the following formula:

$$A = -2^N/\log_2 D,$$

where D indicates a predetermined dynamic range of all occurring real or imaginary values in a linear representation and N indicates a predetermined number of binary places before the decimal point.

According to a further example embodiment of the radar system of the present invention, the first factor S, the second factor A, a number N of places before the decimal point and a number M of places after the decimal point are selected such that the following relationship is fulfilled for all permissible values X of the real component or imaginary component of the complex numerical value:

$$(2^{N+M} - 1)/2^M \geq A \cdot \log_2(\text{abs}(S \cdot X)).$$

The values for N, M, A and S can preferably be selected to be the same for the real and imaginary components, but can also be selected to be different.

According to a further example embodiment of the radar system of the present invention, the evaluation unit is further designed to convert the logarithmic fixed point representations of the real component of the complex data value and the imaginary component of the complex data value stored in the memory unit back into the complex data value and to calculate a speed-distance representation by means of a Fourier transform.

According to a further example embodiment of the radar system of the present invention, the memory unit is a semiconductor memory, such as an SRAM (Static Random Access Memory) memory, a DRAM (Dynamic Random Access Memory) memory or any other conventional memory that allows fast access times.

According to a further example embodiment of the radar system of the present invention, a size of the memory unit is less than P megabytes, wherein P is a predetermined number. By using the compact logarithmic fixed point representation, the required storage space can be reduced to 0.75P megabytes or less.

According to a further example embodiment of the radar system of the present invention, the evaluation unit is an application-specific integrated circuit (ASIC). One ASIC is usually sufficient to perform the necessary calculations.

Further advantages, features and details of the present invention will become apparent from the following description, in which various exemplary embodiments are described in detail with reference to the figures.

The numbering of method steps serves the purpose of clarity and is generally not intended to imply a specific chronological order. In particular, a plurality of method steps may also be carried out simultaneously.

DETAILED DESCRIPTION OF EXAMPLE EMBODIMENTS

Figure 1:
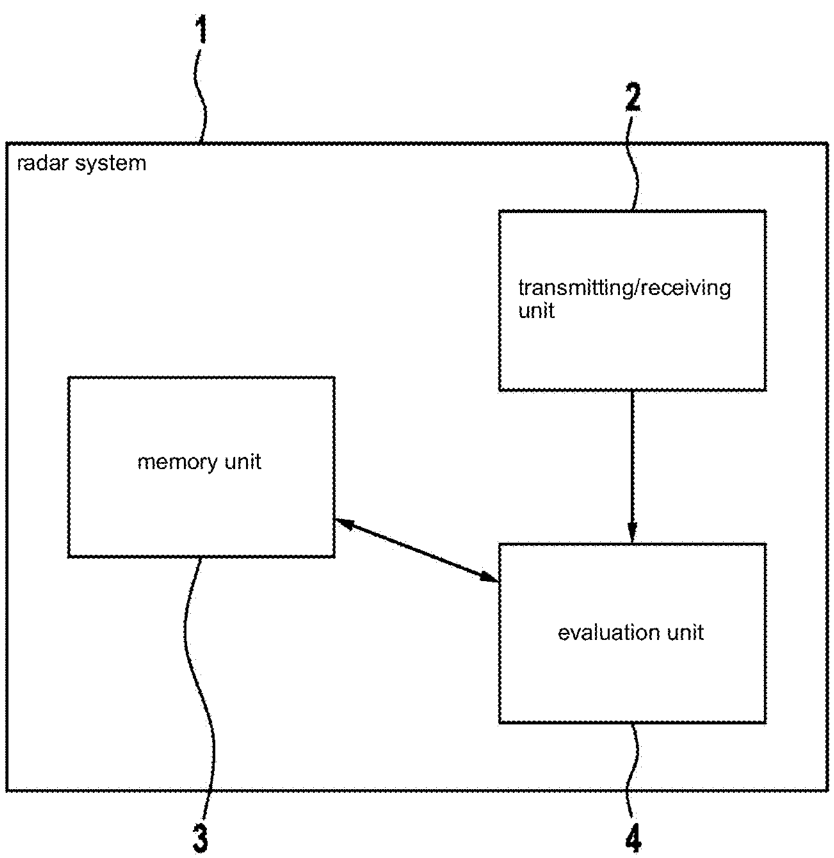
FIG. 1 shows a schematic block diagram of a radar system according to one example embodiment of the present invention.

FIG. 1 shows a schematic block diagram of a radar system 1 with a transmitting/receiving unit 2, which generates and outputs radar signals by means of a fast chirp modulation method (fast chirp FMCW method) and receives chirps of the reflected radar signals. In this case, the transmitting/receiving unit 2 comprises, in a known manner, transmitting antennas and receiving antennas for transmitting and receiving the radar radiation.

The radar system 1 also comprises a memory unit 3 and an evaluation unit 4. The memory unit 3 is preferably a semiconductor memory, such as an SRAM memory, a DRAM memory or a comparable memory.

The evaluation unit 4 is preferably an application-specific integrated circuit (ASIC). The evaluation unit 4 can also comprise one or more microprocessors, microcontrollers or the like. The memory unit 3 can also be part of the same ASIC or it can be external to the ASIC.

The evaluation unit 4 uses a Fourier transform to create a multi-dimensional radar data cube with a plurality of bins based on the received chirps of the reflected radar signals. Each bin is assigned a complex data value. For each complex data value, the evaluation unit 4 converts the real component of the complex data value into a logarithmic fixed point representation.

In the same way, the evaluation unit converts the imaginary component of the complex data value into the logarithmic fixed point representation. The calculated values are stored in the memory unit 3. The evaluation unit 4 can then use the temporarily stored values to recalculate the complex data value and perform a second FFT to obtain a speed-distance representation.

Figure 2:
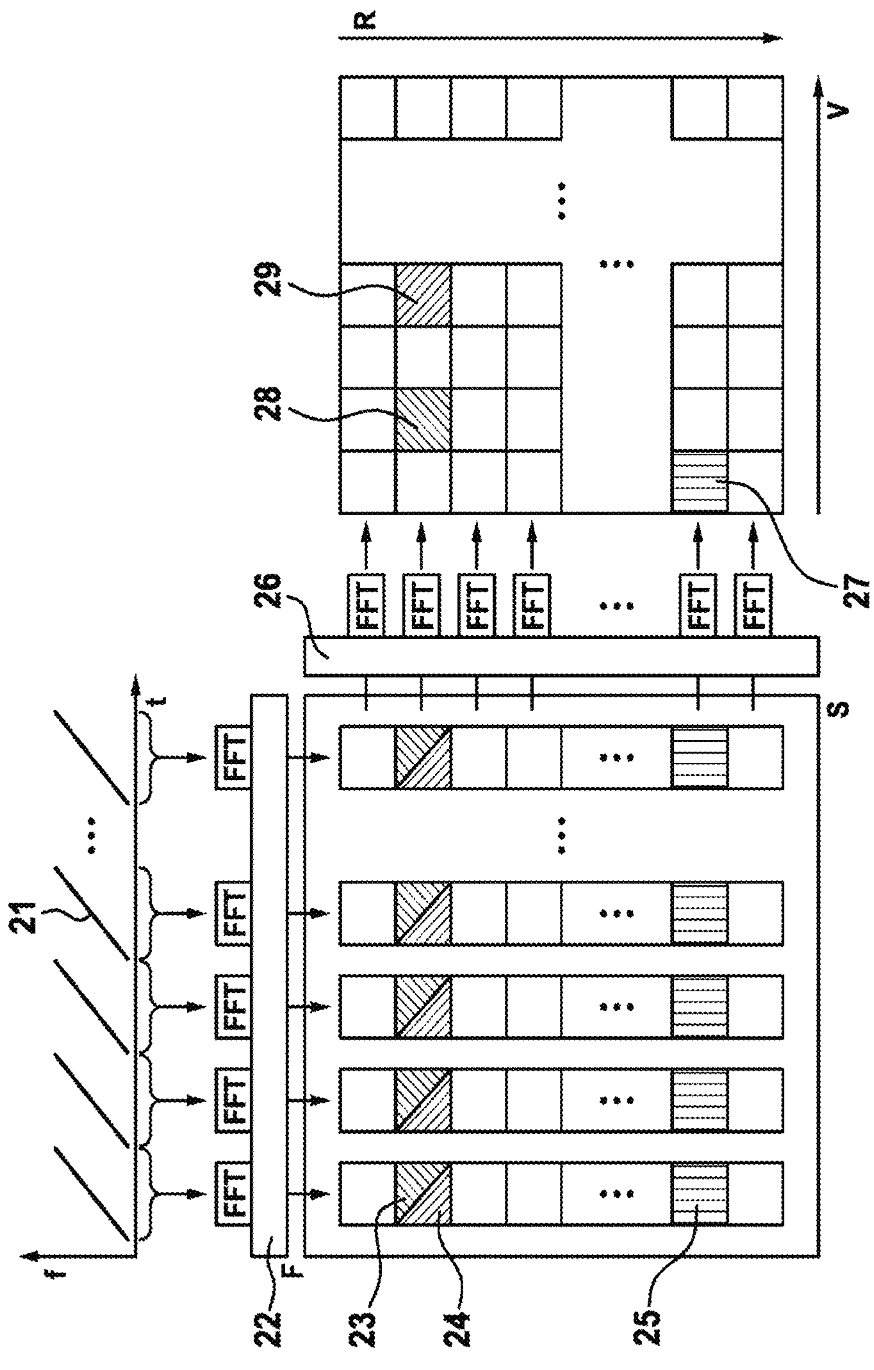
FIG. 2 is a schematic diagram explaining the calculation of a multi-dimensional radar data cube, according to an example embodiment of the present invention.

FIG. 2 is a schematic representation explaining the calculation of a multi-dimensional radar data cube. In the fast chirp modulation method (fast chirp FMCW method), what are known as chirp sequences 21 are transmitted one after the other via antennas of the transmitting/receiving unit 2, which chirp sequences are represented as rising lines in the frequency f over time t. These chirps 21 are mixed down to the baseband in the receiving part of the transmitting/receiving unit 2 and converted into digital data streams by analog-to-digital converters of the transmitting/receiving unit 2.

The data streams are then transformed into the frequency domain in a digital processing unit using a Fourier transform (FT) and stored in the memory unit 3. Because these are multi-dimensional data structures, the result is a multi-dimensional radar data cube. In this case, multi-dimensional here means two-dimensional or higher. The multi-dimensional radar data cube comprises bins 23, 24, 25, wherein the complex data values assigned to the bins are converted into logarithmic fixed point representations of the real and imaginary components by means of a compaction step 22. For further processing, the complex linear data value for each bin is recalculated in an unpacking step 26 and a second Fourier transform is used to obtain an R-v representation having the distance R and the relative velocity v as axes. Bins 27, 28, 29 in the R-v representation are derived from a plurality of bins 23, 24, 25 of the radar data cube.

The second Fourier transform corresponds to access in a transposed dimension, i.e. row-by-row access in FIG. 2. To allow this transposed access to the data, the data structure is temporarily stored in the memory unit 3 as described above.

The evaluation unit 4 is designed to scale a logarithm of an absolute value of the real component or imaginary component scaled by a first factor S by a second factor A in order to convert the real component of the complex data value or the imaginary component of the complex data value into the logarithmic fixed point representation. The evaluation unit 4 can use the following conversion function:

$$Y = A \cdot \log_2(\text{abs}(S \cdot X)) = A \cdot (\log_2(\text{abs}(X)) + \log_2(S)) = A \cdot \log_2(\text{abs}(X)) + A \cdot \log_2(S),$$

where X denotes the real component or the imaginary component of the complex data value. Furthermore, $\log_2$ denotes the logarithm to base 2 (logarithmus dualis). The abbreviation abs refers to the absolute value. Finally, Y is the output value for the real component or imaginary component. Due to the calculation rules of the logarithm, the contribution of S can also be represented as an output-side addition of a constant $A \cdot \log_2 (S)$.

The first factor S is greater than 0. The first factor S can be selected to be equal to the inverse of the maximum permissible value for the absolute value of the real component or imaginary component. The first factor S can be calculated according to the following formula:

$$S = 1/\max(\text{abs}(X)).$$

The second factor A can be selected according to the following formula:

$$A = -(2^N - 1)/\log_2 D,$$

where D indicates a predetermined dynamic range of the absolute real and imaginary components X in a linear representation and N indicates a predetermined number of places before the decimal point. The dynamic range D indicates a ratio of the maximum range of X to the minimum range of X. For example, D=100000 corresponds to a dynamic range of 100 dB.

The specifications of A and S ensure that the number range for Y in the area of places before the decimal point is fully exploited, i.e. it results in $$Y = -(2^N - 1)/\log_2 D \log_2((\text{abs}(X)/\max(\text{abs}(X)))$$

The resulting binary number representation of Y can then be represented in individual bits as follows, assuming that N places before the decimal point and M places after the decimal point and one bit are used as a sign:

| Bit position of the result for the binary representation of Y | Meaning of the bit position | Decimal value of the bit position |
|---|---|---|
| 0 | Sign of X: 0 if X ≥ 0; 1 if X < 0 | |
| 1 | Bit N − 1 (Y) | $2^{N-1}$ |
| 2 | Bit N − 2 (Y) | $2^{N-2}$ |
| 3 | Bit N − 3 (Y) | $2^{N-3}$ |
| . . . | . . . | . . . |
| N | Bit 0 (Y) | $2^0 = 1$ |
| N + 1 | Bit −1 (Y) | $2^{-1} = 0.5$ |
| N + 2 | Bit −2 (Y) | $2^{-2}$ |
| . . . | . . . | . . . |
| N + M | Bit −M (Y) | $2^{-M}$ |

Overall, the result is represented here with N+M+1 bits.

The key aspect about the number representation is that it is a fixed point representation that is optimized for the hardware used. Comparable number representations are also possible: for example, instead of the sign, a binary digit with a weight of $-2^N$ can be used, so that the magnitude of the resulting number corresponds to Y and the sign of the resulting number matches the sign of X.

In addition, other standardizations can be used for A and S than those used by way of example above.

A key difference from the commonly used floating point representations is that the final binary representation of Y has only a logarithmic part and no scalar mantissa. This representation avoids jumps in the quantization error when changing an exponent of a standard floating point representation, and the quantization error is distributed more evenly over the entire number range.

In addition, the first factor S, the second factor A, a number N of places before the decimal point and a number M of places after the decimal point are preferably selected such that the following relationship is fulfilled for all permissible values X of the real component or imaginary component of the complex numerical value:

$$(2^{N+M} - 1)/(2^M) \geq A \cdot \log_2(\text{abs}((S \cdot X)).$$

This prevents an overflow of the maximum representable range.

The number N of digits before the decimal point and the number M of digits after the decimal point can preferably be determined during the development of the radar system 1. The first factor S and the second factor A can preferably be determined or set during the implementation of the chip of the radar system 1.

In an alternative embodiment, it is also possible to perform clipping, i.e. to force a limitation of the input value of X when calculating Y. This should be done in such a way that the requirements of the radar system 1 are met.

In an exemplary embodiment:

$$\max(\text{abs}(X)) = 2^{31}.$$

In addition, 11 places before the decimal point are used (N=11) and no places after the decimal point (M=0). For the dynamic range D, D=110 dB is selected. Furthermore, $$S = 2^{-31} - 1, \log_2(S) = -31$$

and $$A = 2^{11} / -\log_2(10^{110/20}) = -2^{11} \cdot 20 \cdot \log 10(2)/110 \approx 112.1$$

are selected. The aforementioned numerical values are only exemplary and the present invention is not limited thereto.

Figure 3:
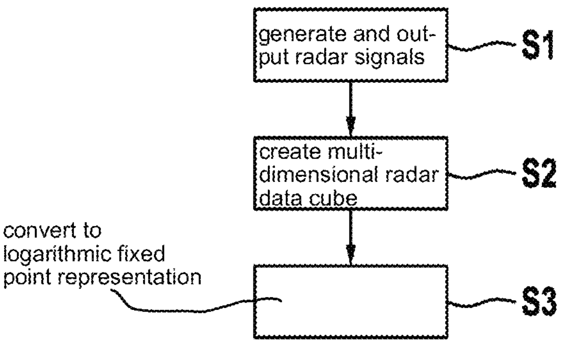
FIG. 3 shows a flow chart of a method for operating a radar system according to one example embodiment of the present invention.

FIG. 3 shows a flow chart of a method for operating a radar system 1, which can be the radar system 1 described above.

In a first method step S1, radar signals are generated and output by a transmitting/receiving unit 2 of the radar system 1 using a fast chirp modulation method. The transmitting/receiving unit 2 receives chirps of the reflected radar signals.

In a second method step S2, an evaluation unit 4 of the radar system 1 creates a multi-dimensional radar data cube with a plurality of bins based on the received chirps of the reflected radar signals by means of a Fourier transform. Each bin is assigned a complex data value.

In a third method step S3, the evaluation unit 4 converts a real component of the complex data value and an imaginary component of the complex data value into a logarithmic fixed point representation for each complex data value and stores the logarithmic fixed point representation of the real component of the complex data value and the logarithmic fixed point representation of the imaginary component of the complex data value in a memory unit 3 of the radar system 1.

The evaluation unit 4 can also convert the logarithmic fixed point representations of the real component of the complex data value and the imaginary component of the complex data value stored in the memory unit 3 back into the complex data value and calculate a speed-distance representation by means of a Fourier transform.

The invention claimed is:

1. A radar system, comprising:

a transmitting/receiving unit configured to generate and output radar signals using a fast chirp modulation method, and to receive chirps of reflected radar signals;

a memory unit; and an evaluation unit configured to:

based on the received chirps of the reflected radar signals, create a multi-dimensional radar data cube with a plurality of bins, using a Fourier transform, wherein each of the bins is assigned a complex data value, for each of the complex data values, convert a real component of the complex data value and an imaginary component of the complex data value into a logarithmic fixed point representation, and store the logarithmic fixed point representations in the memory unit.

2. The radar system according to claim 1, wherein the evaluation unit is configured to scale, by a second factor A, a logarithm of an absolute value of: (i) the real component of the complex data value or (ii) the imaginary component of the complex data value, scaled by a first factor S, in order to convert the real component of the complex data value or the imaginary component of the complex data value into the logarithmic fixed point representation.

3. The radar system according to claim 2, wherein the first factor S is selected to be equal to an inverse of a maximum permissible value for the absolute value of the real component or the absolute value of the imaginary component.

4. The radar system according to claim 2, wherein the second factor A is selected according to the following formula:

$$A = -2^N/\log_2 D,$$

where D indicates a predetermined dynamic range in a linear representation and N indicates a predetermined number of places before a decimal point.

5. The radar system according to claim 2, wherein the first factor S, the second factor A, a number N of places before a decimal point and a number M of places after the decimal point are selected such that the following relationship is satisfied for all permissible values X of the real component of the complex numerical value or imaginary component of the complex numerical value:

$$(2^{N+M} - 1)/2^M \geq A \cdot \log_2(\mathrm{abs}(S \cdot X)).$$

6. The radar system according to claim 2, wherein the evaluation unit is further configured to convert the logarithmic fixed point representations of the real component of the complex data value and of the imaginary component of the complex data value stored in the memory unit back into the complex data value and to calculate a speed-distance representation using a Fourier transform.

7. The radar system according to claim 2, wherein the memory unit is a semiconductor memory.

8. The radar system according to claim 2, wherein the evaluation unit is an application-specific integrated circuit (ASIC).

9. A method for operating a radar system, comprising the following steps:

generating and outputting radar signals using a fast chirp modulation method, using a transmitting/receiving unit of the radar system, and receiving chirps of reflected radar signals using the transmitting/receiving unit;

creating, using an evaluation unit of the radar system, a multi-dimensional radar data cube with a plurality of bins based on the received chirps of the reflected radar signals using a Fourier transform, wherein each of the bins is assigned a complex data value; and converting, using the evaluation unit of the radar system, for each complex data value, each of a real component of the complex data value and an imaginary component of the complex data value into a logarithmic fixed point representation and storing the logarithmic fixed point representation of the real component of the complex data value and the logarithmic fixed point representation of the imaginary component of the complex data value in a memory unit of the radar system.

* * * * *